Oct. 20, 1931. P. CARPENTER 1,828,392
SAW SETTING MACHINE
Filed June 6, 1929 2 Sheets-Sheet 1
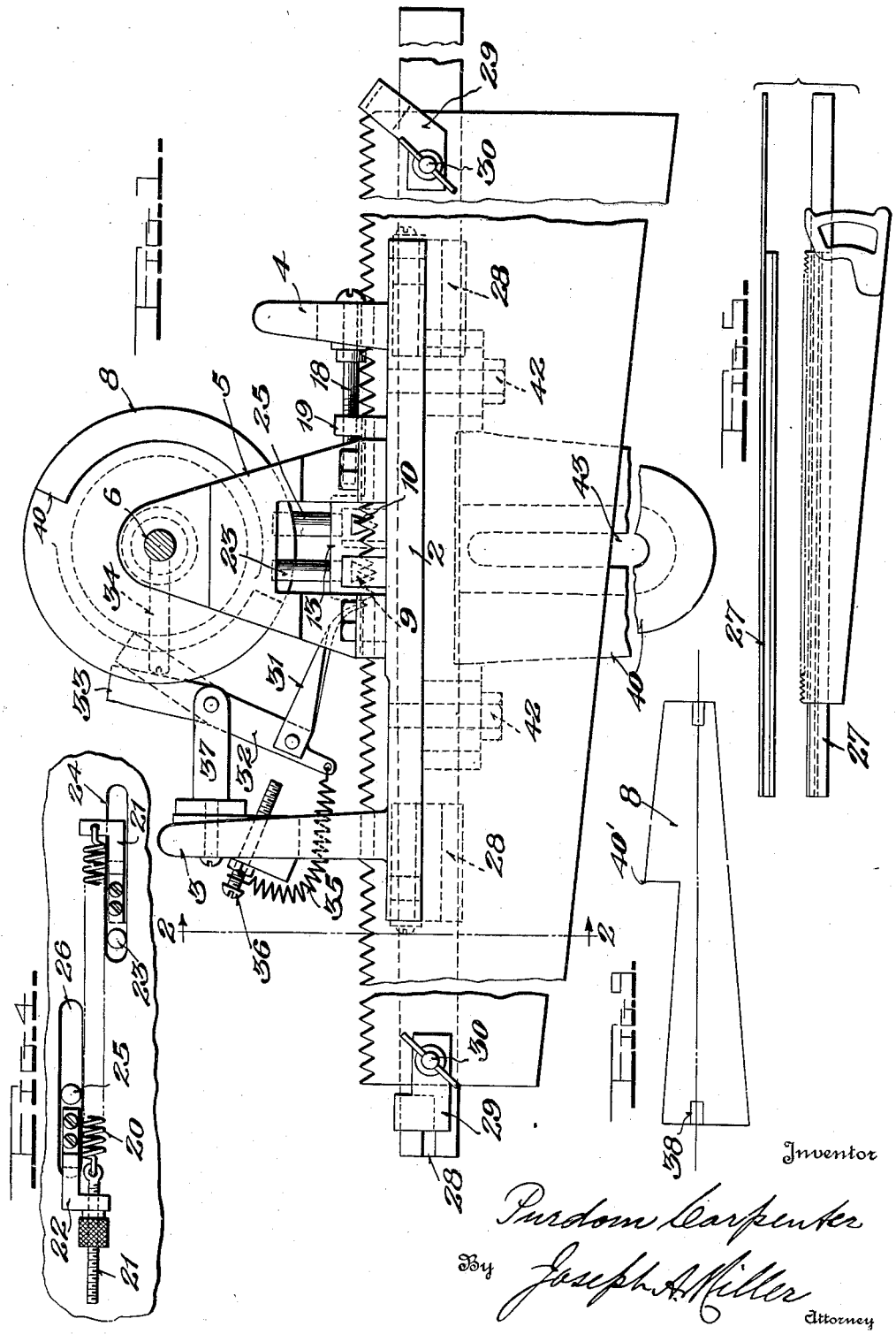
Inventor
Purdom Carpenter
By Joseph A. Miller
Attorney Oct. 20, 1931.  P. CARPENTER  1,828,392
SAW SETTING MACHINE
Filed June 6, 1929  2 Sheets-Sheet 2
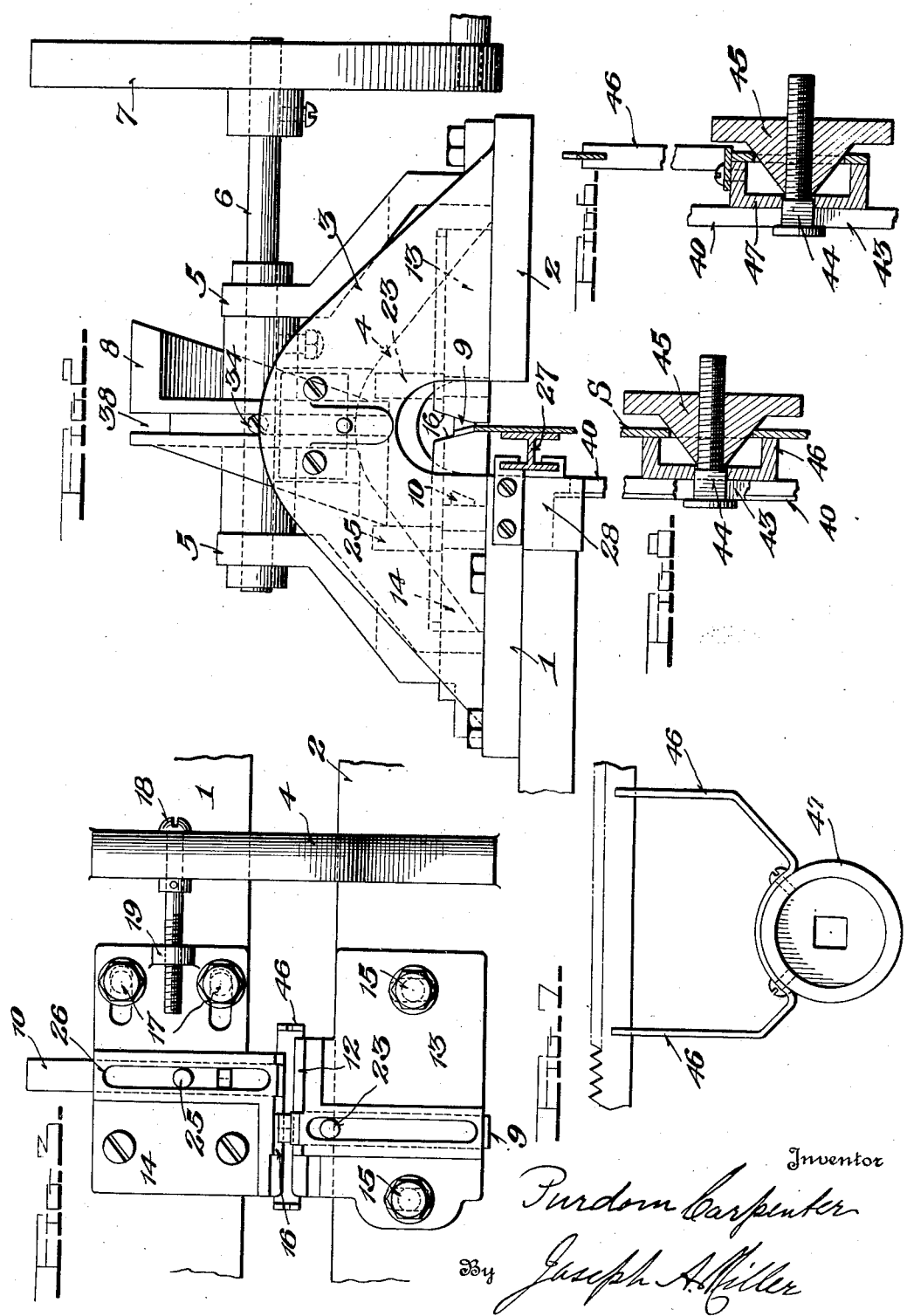
Inventor
Purdom Carpenter
By Joseph A. Miller
Attorney Patented Oct. 20, 1931

1,828,392

UNITED STATES PATENT OFFICE

PURDOM CARPENTER, OF BARRINGTON, RHODE ISLAND

SAW SETTING MACHINE

Application filed June 6, 1929. Serial No. 368,824.

This invention relates to certain new and useful improvements in saw setting machines and the primary object thereof is to provide a machine which automatically sets or bends the teeth of hand saws, band saws and circular saws, alternately in opposite directions, for the purpose of clearance and which at the same time effects setting of both sides of the saw teeth in one operation, and also sets each tooth on each side of the saw to the same degree of set.

A further object of the invention is to provide a single spring for tensioning each of the saw tooth setting hammers, thereby to assure the same degree of tension being exerted on each hammer and further to provide adjustable spring means so that upon adjustment to preserve uniformity of tension as to each hammer. A still further object of the invention is to provide a single means for actuating each of the hammers and also the saw advancing means.

The invention still further resides in the construction and combination of elements as will be later set forth.

In the drawings:—

Figure 1 is a side elevation of the invention, partly in section;

Figure 2 is a section on line 2—2 of Figure 1;

Figure 3 is a detail top plan view of the anvils and associated hammers;

Figure 4 is a detail bottom plan view of the spring means for tensioning the hammers;

Figure 5 is a top plan and side edge elevation of the saw carrier;

Figure 6 is a detail view partly in section of the carrier used in connection with a band saw;

Figure 7 is a front elevation of Figure 6 but showing the cone and its arbor removed;

Figure 8 is a similar view of the holder used in connection with circular saws, and Figure 9 is a diagrammatic view of the cam for actuating the hammers and the saw advancing means.

In proceeding in accordance with the present invention a bed plate is employed which is composed of spaced sections 1 and 2 that are connected at their ends by bridge members 3 and 4. Angular standards 5 are bolted to the respective sections 1 and 2 about central of the length thereof and at their upper ends provide journals for a main shaft 6, the latter having a drive wheel 7 secured at one end thereof and at a point between the standards 5 and cam 8.

Hammers 9 and 10 are slidably mounted on the sections 1 and 2 in opposed relation and have their working ends confronting stationery anvils 11 and 12, the anvils being formed on or carried by blocks 13 and 14 respectively that are secured to the bed sections, the blocks also being formed to provide guides for the respective sliding hammers 9 and 10. The inner ends of the anvils are spaced a distance equal to the thickness of the saw blade which is being set. The bolts 15 which secure the block 13 in position operate in elongated slots so as to enable the block to be adjusted to accommodate saws of varying thickness. As shown in Figure 2 the blocks have beveled faces 16 to engage the saw teeth and to set same at the desired angle. The block 14 is adjustable longitudinally of its section 1 and is held in adjusted position by bolts 17 so as to allow for the adjustment of the hammer as required in setting saw teeth of different sizes, which adjustment is effected by a screw 18 threaded through a lug 19 carried by block 14, the screw being rotatably supported by the bridge member 4. The hammers are identical in construction and are preferably formed of rectangular bars which slide in grooves provided therefor in the under sides of the blocks 13 and 14, and in order to insure a uniform set for the teeth on both sides of the saw, both hammers are actuated by the same or a common coil spring 20, one end of the spring being secured to hammer 9 by an L-shaped lug 21 fastened to the hammer while the other end of the coil spring is secured to an adjustable screw 21 carried by a similar lug 22 that is fastened to the other hammer. The hammer 9 is provided with an upwardly projecting pin 23 which operates in an elongated slot 24 provided therefor in the block 13 while a similar pin 25 is carried by the hammer 10 and operates in a slot 26 in its block. As shown in dotted lines in Figure 2 the pins 23 and 25 engage the cam 8 on its opposite sides. As shown in Figure 1 the working faces of the hammers are triangular in cross section and are beveled to adapt them for different sizes of saw teeth.

As shown in Figure 5 of the drawings, a carrier 27 is provided for a hand saw, which carrier is held in a jaw 28 as shown in Figures 1 and 2 of the drawings.

For the purpose of advancing the saw and carrier through the machine, a feed pawl 31 is provided which is pivoted to a lever 32, the lever having an end 33 which is engaged by a screw 34, carried by the cam, the screw being adjustable so as to vary the length of the movement of the feed pawl according to saw teeth of different sizes. The feed pawl is adjusted so that it will engage every second tooth of the saw and move same in order that the teeth will be exactly opposite the respective hammers 9 and 10. The lever 32 is tensioned by a coil spring 35 connected thereto and to a stop screw 36, the latter being capable of being set so as to limit the extent of backward movement of the lever. The screw 36 is carried by the bridge member 3 and the lever 32 is pivoted to an arm 37 likewise carried by the said bridge member.

Figure 9 shows a development of the cam wherein same has a peripheral groove 38 in which the end 33 of lever 32 operates. The sides of the cam are beveled as shown in Figures 2 and 9, and are formed to first move the hammers outwardly against the tension of spring 20 and to then release same when the pins pass the point 40 whereupon the spring 20 contracting causes the hammer to deliver blows to the saw teeth. The hammers however, deliver alternate blows, that is to say, one hammer is practically at rest while the other hammer is delivering its blow.

For the purpose of holding a circular saw in position an arm 40 is adjustably bolted to and depends from the bed section 1 as shown at 42 and has a slot 43 in which an arbor 44 is movable and is held by a cone 45 threaded on the arbor and engaged through the hole in the circular saw into a cup 36 which latter is perforated at its bottom to receive the arbor 44. Thus the arbor by virtue of its cone shape fits various sizes of holes in saws. As shown in Figures 6 and 7 of the drawings a band saw supporting U-shaped member having arms 46 is employed and is secured to a cone arbor cup structure 47 similar to that shown in connection with Figure 8.

In operation the wheel 7 is rotated and through the shaft 6 drives the cam 8, whereby the latter not only actuates the feed pawl 31 but also the hammers 9 and 10.

From the foregoing it will be seen that a single cam 8 is employed to not only actuate the hammers but to also advance the saw and due to the fact that a single spring 20 is employed to actuate both of the hammers absolute accuracy and uniformity of set of the teeth is assured. Moreover, in any adjustment of the spring through the screw 21 thereof to vary the force of the hammer blows, maintenance of uniformity of such blows is assured.

Having thus described my invention what I claim as new and desire to secure by Letters Patent is:—

1. In a saw setting machine, a bed composed of spaced sections, bridge members connecting the sections, opposed anvils rigidly secured to the sections and formed to engage opposite sides of a saw, means to support a saw in said space between the bed sections, a pair of slidable hammers carried by the respective sections and formed to engage adjacent teeth on opposite sides of the saw, means for advancing the saw including a spring tensioned lever, a screw for limiting the idling movement of the lever, a pivoted feed pawl carried by the lever and formed to engage the teeth of the saw, a cam having a groove in which an end of the lever operates, an adjustable screw carried by the cam to engage the lever, so as to actuate and control the extent of working movement of the lever, projections on the hammers formed to engage opposite sides of the cam, said opposite sides of the cam being formed to alternately actuate the hammers, and a single spring connected to each of the hammers for holding same under tension.

2. In a saw setting machine, a bed composed of spaced horizontally disposed sections, spaced bridge members connecting the sections adjacent the ends thereof and disposed in overlying relation to the sections, means to support a saw in said space between the bed sections, saw teeth setting means carried by the sections, means for advancing the saw including a lever having a free upper end, means to pivotally mount the lever between its ends on the rear of one of the bridge members, a saw tooth engaging pawl carried by the lower end of the lever, a spring connected to the lower end of the lever and to the said bridge member and means to operate the lever by engagement with the free end thereof, including a cam disposed above the bed and arranged in front of the lever.

3. In a saw setting machine, a bed, anvils carried by the bed, a pair of slidable hammers carried by the bed and formed to engage adjacent teeth on opposite sides of the saw, said hammers being arranged to slide in spaced parallel planes, pins carried by the anvils and projecting downwardly through the bed, an L-shaped lug secured at one of its ends to each hammer and having their opposite ends projecting in the said space between the planes in which the hammers slide, and a coil spring extending in said space between the planes in which the hammers slide and having one end affixed to said opposite end of one of the last named lugs, and having its opposite end adjustably connected to said opposite end of the other lug.

In testimony whereof I have signed my name to this specification.

PURDOM CARPENTER.